US010106764B2

(12) United States Patent
Estes

(10) Patent No.: US 10,106,764 B2
(45) Date of Patent: Oct. 23, 2018

(54) TEQUILA

(71) Applicant: NUMERO OCHO LIMITED, London (GB)

(72) Inventor: Thomas George Estes, Ashland, OR (US)

(73) Assignee: NUMERO OCHO LIMITED, London (GB)

( * ) Notice: Subject to any disclaimer, the term of this patent is extended or adjusted under 35 U.S.C. 154(b) by 463 days.

(21) Appl. No.: 13/658,897

(22) Filed: Oct. 24, 2012

(65) Prior Publication Data

US 2014/0113052 A1    Apr. 24, 2014

(51) Int. Cl.
*C12G 3/06* (2006.01)

(52) U.S. Cl.
CPC ..................... *C12G 3/06* (2013.01)

(58) Field of Classification Search
USPC .................................................. 426/590, 592
See application file for complete search history.

(56) References Cited

U.S. PATENT DOCUMENTS

2005/0084597 A1*  4/2005  Wasmund, Jr. ............... 426/592
2008/0299258 A1* 12/2008  Roman et al. ................. 426/71
2010/0178411 A1*  7/2010  Mayer ........................... 426/592

FOREIGN PATENT DOCUMENTS

JP        2004244382 A  *  9/2004

OTHER PUBLICATIONS

Renee Schettler, Article: The Secret to the Perfect Margarita—Washington Post.com, Wednesday, Aug. 14, 2002; p. F07 http://agavesyrup.net/articles/margarita.html.*
Herstein Karl M., Chemistry and Technology of Wines and Liquors, 1948, D.Van Nostrand Company, Inc., $2^{nd}$ edition, pp. 217-222.*

* cited by examiner

*Primary Examiner* — Vera Stulii
(74) *Attorney, Agent, or Firm* — Ladas & Parry LLP

(57) ABSTRACT

A tequila beverage comprising a standard tequila beverage containing added components for making said standard tequila beverage more desirable to a consumer.

18 Claims, No Drawings

TEQUILA

FIELD OF THE INVENTION

This invention relates to an enhanced tequila beverage and a process for the production thereof.

BACKGROUND OF THE INVENTION

As used herein a standard tequila beverage is any tequila conventionally made from the roasted center (piña or heart) of the blue agave. A standard tequila beverage is used as a starting material herein and a summary of methods for producing said standard tequila beverage for use as said starting material is set out below.

Tequila is an alcoholic drink made predominately in the arid highlands of central Mexico from fermented and distilled sap from the blue agave (*Agave tequilana*) plant. Tequila is conventionally made from the roasted center (piña or heart) of the blue agave. This part of the plant is also sometimes called the head or cabeza and looks like a large pineapple or pine cone. This portion of the plant starts underground but soon pushes its way into the light. A mature piña or heart may weigh from 80 lbs. to more than 300 lbs.

When ready for harvesting, the carbohydrate rich piña or heart is cut from its stalk. Then the 200 or more spiky and thorn covered leaves (pencas) that stand out from the blue agave are cut away from the piña or heart by a harvester. The piña or heart is then used to make tequila.

SUMMARY OF THE INVENTION

In one aspect the subject invention provides an enhanced tequila beverage comprising a standard tequila beverage containing added components (such additional flavoring and aroma components obtained from agave plants, especially blue agave plants), for making said standard tequila beverage more desirable to a consumer. Such "added components" need not be different from those in traditional tequila and may be the same as components naturally present in tequila but at an increased concentration.

In a further aspect the subject invention provides a process comprising providing a standard tequila beverage and then adding thereto components for making such "enhanced tequila"

One way in which to produce such enhanced tequila is by incorporation compounds extracted from agave hearts, especially blue agave hearts, into tequila, for example by infusion of extracts from cooked agave hearts into tequila.

Other aspects of the subject invention are described herein and set out in the claims hereof.

DESCRIPTION OF THE INVENTION

Methods of producing a standard tequila beverage for use as a starting material of the process for making said enhanced standard tequila beverage of the subject invention are known.

The first step of tequila production for producing a standard tequila beverage for use as a starting material of the process of the subject invention is harvesting of the piña or heart—the portion of the plant resembling a pineapple that contains a reserve of inulin which is a form of starch. Harvesting involves cutting of the entire above-ground portion of the plant from the roots and subsequent removal and disposal of the pencas or leaves from the hearts.

The hearts are then cooked to hydrolyze the inulin to fermentable sugars. The sugars from the cooked hearts are then converted by fermentation by yeast to produce alcohol (ethanol). The alcohol is distilled to provide tequila. Various treatments after distillation yield the different classes of tequila (silver, gold, reposado, añejo and extra añejo). Sugar from a source other than the agave, such as cane sugar may be used in amounts of up to 49% (w/v) to produce mixto tequila. 100% agave tequila cannot use this added sugar.

This type of processing has been in progress for hundreds of years in Mexico.

Any commercially available tequila can be used as a starting material for the subject process to make a commercially available tequila more desirable to a consumer. Alternatively if the process of the subject invention is to be operated alongside a conventional process for making a standard tequila beverage then the standard tequila beverage is taken for further processing by the process in accordance with the subject invention before bottling.

The standard tequila beverage which is the starting material for the process of the subject invention is put into a suitably sized stainless steel tank. Alternatively any other container suitable for use in the processing of alcoholic beverages suitable for human consumption can be used.

Any suitable amount of standard tequila beverage starting material can be used. Batch sizes will in practice be determined by financial and/or other economic considerations. Preferably 800 to 1,200 liters of standard tequila beverage is placed in a 2,500 to 3,500 liter stainless steel tank.

The additional components to be added to the standard tequila may be obtained in any convenient way, for example by cooking algave hearts, such as blue agave hearts and then extracting tequila-enhancing components from the cooked agave hearts, for example by pressing the cooked hearts to extract liquid components, flushing a mass of cooked product with water or some other carrier, including standard tequila or other convenient ways. Once the components have been extracted, they may be added to standard tequila in any convenient way to produce the desired concentration of added component to produce the desired flavor, aroma and/or color.

If desired, the extract may be filtered and/or subjected to techniques such as passing through an adsorbant column to effect a chromatographic change in the ratio of components present before adding to standard tequila.

One way we have found to be particularly useful to add the desired components is to pack cooked agave hearts, preferably after chopping into small pieces, into water-permeable bags, similar to large tea-bags and use these to infuse the desired components, such as flavor and aroma components from the cooked agave hearts into standard tequila.

A tea bag like structure for infusing an infusant into the standard tequila beverage is prepared as follows. Blue agave is harvested from the Highland region of the state of Jalisco, Mexico in the usual way. The leaves of this harvested blue agave are then cut away from each blue agave heart by well known procedures which are conventionally used in methods for producing the standard tequila beverage starting material.

After removal of the leaves each produced blue agave heart is then cooked until sufficiently soft to be chopped up into small pieces. Preferably the cooking comprises steaming the blue agave hearts for from 30 to 40 hours, more preferably from 32 to 38 hours, yet more preferably from 35 to 37 hours. Any known container can be used for containing the blue agave hearts during steaming. Preferably the blue agave hearts are steamed in a suitably sized stone cooking oven. In one preferred cooking step each blue agave heart is halved and then placed in a suitably sized stone cooking oven and is then cooked by use of direct steam. After cooking the cooked blue agave is cut up into smaller pieces for being contained in an infusing container. Preferably the cooked blue agave is cut up into substantially regular shaped bocks having about equal dimension in each direction. More preferably these blocks have a size of about 80 mm length, 10 mm width, 5 mm thickness in each of their respective length dimensions. Any method for cutting up the cooked blue agave may be used provided it is suitable for cutting up an ingredient which is to be used for infusing into an alcoholic beverage for human consumption. Preferably the cooked blue agave is cut up by chopping on wooden chopping boards using machetes. This chopped blue agave is then placed into infusing containers for infusing into a standard tequila beverage as will be described below.

In order to produce an optimal end product it is desirable to infuse a preferred amount of infusant derived from the cooked chopped blue agave hearts into the standard tequila beverage starting material. As we shall describe below a tequila end product of the subject process is an optimal tequila end product when it is judged to be so by an expert human tequila tester. It is desirable in order to produce said optimal tequila end product to use certain ratios of amounts of standard tequila beverage starting material to cooked chopped blue agave heart infusant. Preferred ratios of standard tequila beverage starting material to chopped cooked blue agave heart infusant (by weight) are 20-70:1 more preferably 30-60:1 yet more preferably about 48:1.

The cooked chopped blue agave heart infusant is then put into a suitably sized infusion container for infusing the cooked chopped blue agave heart infusant into the standard tequila beverage starting material. Any container that is suitable for this purpose may be used. Preferably a tea-bag like container is used. Preferably the infusing container is made from commercially available cotton fitting material for alimentary use. Other suitable materials can be used provided they are capable of being used for infusion and provided they are suitable for being used to process alcoholic beverages suitable for human consumption.

The tea-bag like containers containing the chopped cooked blue agave hearts are then placed into the tank containing the standard tequila beverage starting material and are then moved around in the stainless steel tank for sufficient time to facilitate infusion of the tequila infusant from inside the tea-bag like container into the standard tequila beverage starting material. Then the tea bag containers are left inside the tank for further infusion and the tank is covered. Preferably the tea-bag like containers are moved around in the stainless steel tank about once a day during the period of infusion.

Infusion is stopped when human tasters subjectively decide that the tequila like attributes for making said standard tequila beverage more desirable to a consumer have been optimized by infusion of the tequila infusant into the standard tequila beverage starting material. Typically this will be after about eight days infusing at outside temperatures which range between a nighttime temperature of 14° C. and a daytime temperature of 32° C. Preferably the tasters will judge the infused tequila for the first time after about 5 days infusing and then subsequently once every day until they decide the tequila like attributes have been optimized. At this time the tea bag containers are taken out of the liquid to stop infusion of the infusant. The tea-bag like containers are then held above the tequila liquid containing the infusant for a sufficient time to let residual tequila contained within the tea-bag like containers drip back into the liquid contained in the container. Typically the tea-bag like containers will be left to drip for a period of a few hours, more preferably for 5 hours. The enhanced tequila product is then passed to a filtration station where it is filtered through a suitable filter so as to remove any particles of cooked agave from the infused tequila product. Preferably a cellulose filter is used although other filters suitable for use for filtering alcoholic beverages for human consumption can be used.

Before bottling can occur permission to bottle must be secured from the CRT (Consejo Regulador del Tequila (or Tequila Council)). The infused tequila product is therefore analyzed by the CRT and is then bottled by bottling processes well known to the skilled addressee. Preferably the infused tequila is filtered for a second time through a further cellulose filter (or other suitable filter for filtering alcoholic beverages for human consumption) before bottling.

EXAMPLE 1,000 liters of standard tequila beverage was placed in a 3,000 liter size stainless steel tank.

Blue agave was harvested from the Highland region of the state of Jalisco, Mexico. The leaves of the harvested blue agave were then cut away from each blue agave heart and each heart was then cut in two halves. Each halved blue agave heart was placed in a stone cooking oven of a sufficient size to accommodate the halved blue agave heart and was then cooked in the oven for 36 hours by direct steam. Then the cooked blue agave was chopped up on wooden chopping boards using machetes. Seven kilograms (7 kg) of the chopped, cooked blue agave heart was then sewed into each one of a number of tea-bag like containers.

Each tea-bag like container was hand made on site from commercially available cotton fitting material suitable for alimentary use.

Three such tea-bag like containers each containing seven kilograms (7 kg) of the chopped, cooked blue agave heart (tea-bags containing in total 21 kg of the chopped, cooked blue agave heart) were then placed in the abovementioned stainless steel tank containing the 1,000 liters of the standard tequila beverage and the tea-bags were then moved around in this stainless steel tank to facilitate infusion of the tequila from inside the tea-bag like container into the standard tequila beverage contained in the stainless steel tank. Then the three tea-bag like containers were left inside the tank for further infusion and the tank was covered. The tea-bag like containers were left in the covered tank for about 8 days, with the actual infusion time for each batch being determined by human tasters who subjectively decide when optimal infusion of Tequila taste has been reached and then order the infusion process be stopped. Once every day the tea-bags were moved around in this stainless steel tank as described above to ensure good infusion of the tequila from inside the tea-bag like container into the standard tequila beverage contained in the stainless steel tank. The stainless steel tank was kept at the outside temperature of the site during the infusing process. This means the temperature ranged between a nighttime temperature of 14° C. and a day time temperature of 32° C. When the human tasters had decided that the optimal infusion of Tequila taste has been reached, the tea-bag like containers were lifted out of the stainless steel container and held above the container for a few hours to drain off excess tequila liquid by dripping the excess tequila liquid from the tea-bag like containers back into the stainless steel container. When draining was complete the tea-bag like containers were removed from the vicinity of the stainless steel tank. The thus infused Tequila product was passed to a filtration station where it was filtered through a cellulose filter to remove any particles of cooked agave from the infused Tequila product.

Next, before bottling of the infused Tequila product can take place, permission has to be secured from the CRT (Consejo Regulador del Tequila) or 'tequila council'. The infused tequila was therefore analyzed by the CRT, and when permission to bottle was give by the CRT the infused Tequila was placed in a tank next to the bottling line, filtered through a further cellulose filter to remove any remaining impurities and then bottled.

Tasting of the infused tequila by the human tasters mentioned above was done in accordance with the following time frame. An initial tasting was done after 5 days of infusion, and then once a day thereafter until the human tasters had decided that the optimal infusion of Tequila taste has been reached.

What is claimed:

1. A tequila beverage comprising a standard tequila beverage containing added components infused from a cooked piña or heart of a blue agave plant for making said standard tequila beverage more desirable to a consumer.

2. A tequila beverage according to claim 1, wherein said added components for making said standard tequila beverage more desirable to a consumer comprise components for imparting added flavor and/or fragrance and/or taste and/or color to said standard tequila beverage.

3. A tequila beverage as claimed in claim 1, wherein an infusion container containing said cooked piña or heart of said blue agave plant is contacted with said standard tequila beverage.

4. A tequila beverage as claimed in claim 3, wherein said infusion container is a tea-bag like infusion container.

5. A tequila beverage as claimed in claim 4, wherein said tea-bag like infusion container comprises a porous pouch for containing said cooked piña or heart of said blue agave plant.

6. A tequila beverage as claimed in claim 5, wherein said standard tequila beverage starting material and said cooked blue agave heart infusant are each present in amounts by weight of said standard tequila beverage starting material to said cooked blue agave heart infusant of 30-60:1.

7. A tequila beverage as claimed in claim 6, wherein said time is about 8 days.

8. A process comprising providing a standard tequila beverage and then contacting said standard tequila beverage with cooked piña or heart of a blue agave plant to infuse components for making said standard tequila beverage more desirable to a consumer into said standard tequila beverage.

9. A process according to claim 8, wherein said components for making said standard tequila beverage more desirable to a consumer comprise blue agave-derived components.

10. A process according to claim 8, wherein said components for making said standard tequila beverage more desirable to a consumer comprise components for imparting added flavor and/or fragrance and/or taste and/or color to said standard tequila beverage.

11. A process as claimed in claim 8, wherein said cooked piña or heart of said blue agave plant is placed into an infusion container and said infusion container is then contacted with said standard tequila beverage.

12. A process as claimed in claim 11, wherein said infusion container is a tea-bag like infusion container.

13. A process as claimed in claim 12, wherein said tea-bag like infusion container comprises a porous pouch for containing said cooked piña or heart of said blue agave plant.

14. A process as claimed in claim 13, wherein said porous pouch for containing said cooked piña or heart of said blue agave plant is made from commercially available cotton fitting material suitable for human alimentary use.

15. A process as claimed in claim 11, wherein said cooked piña or heart of said blue agave plant is chopped before being placed into said infusion container.

16. A process as claimed in claim 11, wherein said infusion container is suspended in a container containing said standard tequila beverage for a time sufficient for imparting added flavor and/or fragrance and/or taste and/or color to said standard tequila beverage.

17. A process as claimed in claim 16, wherein said standard tequila beverage starting material and said cooked blue agave heart infusant are each present in amounts by weight of said standard tequila beverage starting material to said cooked blue agave heart infusant of 30-60:1.

18. A process as claimed in claim 17, wherein said time is about 8 days.

* * * * *